ELIZABETH P. SMITH.
Dress Patterns.
No. 137,967. Patented April 15, 1873.
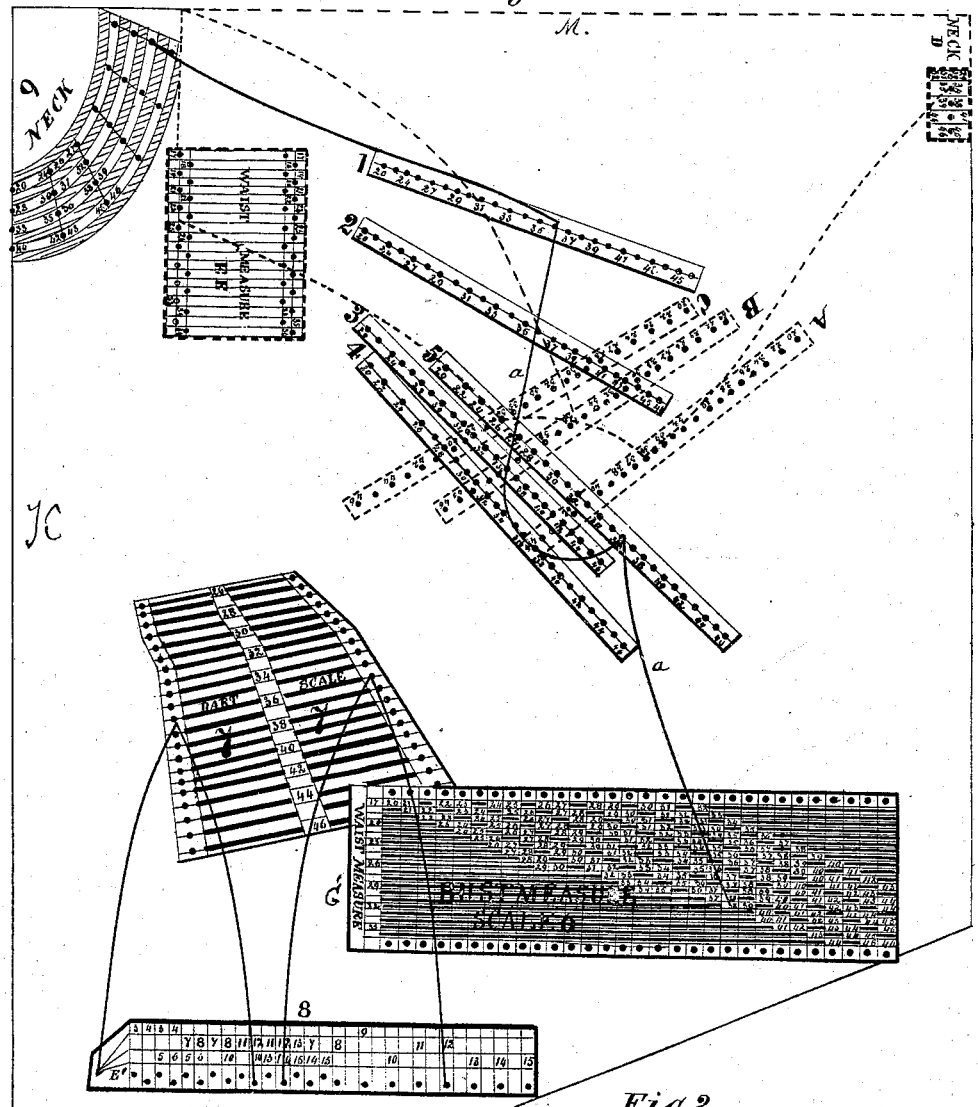

UNITED STATES PATENT OFFICE.

ELIZABETH P. SMITH, OF CHICAGO, ILLINOIS.

IMPROVEMENT IN DRESS-PATTERNS.

Specification forming part of Letters Patent No. 137,967, dated April 15, 1873; application filed February 10, 1873.

*To all whom it may concern:*

Be it known that I, ELIZABETH P. SMITH, of Chicago, in the county of Cook and State of Illinois, have invented a new and useful Improvement in Patterns for Cutting Dress-Waists; and I do hereby declare the following to be a full, clear, and exact description thereof, which will enable others skilled in the art to which my invention appertains to make and use the same, reference being had to the accompanying drawing forming part of this specification, in which—

Figure 1 represents the scale of patterns for the front of waist, and Fig. 2 is the pattern for the back of waist.

My invention has for its object to provide a pattern having a series of scales printed thereon, and so arranged as thereby to measure, lay out, and cut dresses to fit any person; and to that end it consists in two separate sheets or patterns—one representing the front and the other the back of the waist, and each provided with a system of scales or figures corresponding with the measurement of the person to be fitted, and so arranged as to describe the outlines of the front and back of the waist when used in accordance with directions hereinafter given. It further consists in shaping the edges of the separate sheets approximating the curves described by the figures arranged upon the separate scales, by which the requisite curve is formed upon the fabric.

I construct my pattern of thick card or pasteboard, with the scale of figures and dots plainly printed thereon, as represented by the drawing, the several scales being perforated at the point indicated by the dots, which admits of marking the fabric at the respective points indicated by the figures upon the scales, by which the required form is given to the separate parts of the waist, as shown by lines *a* and *d*, Figs. 1 and 2.

In the drawing, figures 1, 2, 3, 4, and 5, marked upon Fig. 1, represent the scales used in giving the size and shape to the shoulder and arm-size of the front portion of the waist. Figure 6 represents the scale used in giving the size of the lower portion of the same. Figures 7 and 8 represent the scales used in determining the size of the dart portion to be cut out of the lower edge of the waist, and figure 9 represents the scale giving the size and curve of the neck.

A, B, and C, Fig. 1, represent the scales used in giving the size and form to the shoulder and arm-size of the back portion of the waist; D, the neck-size; and E, the scale determining the size of the lower portion of the waist. In Fig. 2 of the drawing, the edge, marked F, is the scale and curve for giving the length and form to the shoulder of the front portion of the waist; and G' is the scale for determining the length of the waist. In Fig. 2 the edge marked H is the curve for giving form to the shoulder of the back portion of the waist; and J is the curve for giving form to the lower portion of the same—the several scales and curves being placed upon the fabric, as hereinafter mentioned.

The manner of using my invention is as follows: First, take the bust-measure close under the arms, around the largest portion of the bust; second, the waist-measure snug around the body, at the bottom edge of the proposed dress-waist; third, the length of waist under the arm down to the lower edge of the waist; fourth, the shoulder-measure, from the top of the neck-band along the top of the shoulder to the hollow or bend of collar-bone; fifth, subtract the waist-measure from the bust-measure, the difference being the taper measure of the waist. To lay out the front of waist, first, place the pattern for the front upon the fabric, with the edge *k* parallel with the selvage edge, and sufficient distance therefrom to allow for the fold or part turned under; then mark the fabric through the six holes in scale 9 upon the curved line, in which is found the figures corresponding with the bust-measure; second, mark through the holes in scales 1, 2, 3, 4, and 5, at the figures indicating the bust-measure, and through the holes at the right and left hand of the figures corresponding with the bust-measure in scale 7; third, find the figures in the left-hand column of scale 6, which correspond with the waist-measure; then follow the heavy line to the right until you find the figure indicating the bust-measure; then mark through the holes in the same column above and below the figures; remove the pattern, and draw a curved line through the six dots or marks made in scale 9, which gives the size and form of the neck; fourth, draw a line through the dots or marks made in scales 1, 2, 3, 4, and 5, which gives the form and size of arm; fifth, take the edge of pattern marked F, placing the figure indicating the shoulder-measure upon the upper dot in scale 9; move the pattern until its edge intersects the dot at the line in scale 1; then draw a line along the edge of pattern from dot to dot, which forms the shoulder; sixth, draw a straight line from dot to dot in scale 6; then take the pattern with the scale of inches, placing the point G upon the dot made through scale 5, moving the pattern until the figure indicating the length of waist intersects the line made in scale 6; then draw a line along the pattern from dot to dot, which gives the length and form of the lower part of the waist; seventh, place the pattern upon the fabric, as first; draw a line across the bottom of the waist; dot the fabric through the hole at E′ in scale 8, also through the holes in the three columns containing the corresponding figures, as obtained by subtracting the waist-measure from the bust-measure; eighth, remove the pattern, and place point G on the dot made through scale 7 at the left of the column of figures, allowing the edge to intersect the dot made; through hole E′ draw a line along the edge from point G to dot; then turn the pattern reverse side up, allowing point G to remain on the dot in scale 7; move the pattern to the right until it intersects the first dot made in the column in scale 8; draw a line from point G to dot; then move the pattern to the right until point G is upon the dot made to the right of the column of figures in scale 7 and the edge of the pattern on the right-hand dot in scale 8; draw a line from point G to dot; then turn the rule right side up, allowing point G to remain on the dot in scale 7, moving the pattern until its edge intersects the second dot to the right of hole E′; draw a line from point G to the dot, as before, which completes the form of the front portion of the waist. To lay out the back portion of the waist, first, place the pattern, Fig. 1, with the edge, marked M, upon the edge of the fabric; dot through the hole in the column of figures indicating the bust-measure in scale D; also, through the holes in scales A, B, and C, at the figures corresponding with the bust-measure; second, dot through the holes in scale E in the column of figures in which is found the figures indicating the waist-measure; third, remove the pattern; draw a straight line from dot to dot in scale E; fourth, draw a curved line from dot in scale A through scale B to the dot in scale C; fifth, place the pattern with point H on the dot made through scale D, allowing the edge of the pattern to intersect the dot made through scale A; then draw a line at the edge of pattern, which gives the form of the shoulder; sixth, place the pattern with point G on dot made through scale C, allowing the edge to intersect the line from dots made in scale E; draw a line at edge of pattern; then draw a straight line from the point of intersection of lines in scale E to the edge of the fabric, which gives the bottom of waist; seventh, place the pattern reverse side up, with point J on dot made through scale B; move the pattern to the left until it intersects the lines at the back and bottom of the waist, and draw a line, which completes the form of the back portion of the waist.

In cutting the separate parts of the waist, the lines marked upon the fabric are followed in the usual manner.

It will be observed, by reference to the drawing, that the upper portion of scale 7 is less in width and arranged upon an angle toward the front edge of the pattern from numbers 33 to 31, the object of which is to lessen the distance between the upper part of the darts and to move the same toward the front, which gives a more complete form to the waist for persons of small frame, and especially for children.

Having thus described my invention, what I claim as new, and desire to secure by Letters Patent, is—

The patterns for forming both the front and back of dress-waists arranged upon two separate sheets, with the scales and figures marked thereon, substantially as shown and described.

ELIZABETH P. SMITH.

Witnesses:
SOLON C. KEMON,
THOS. D. D. OURAND.